(12) United States Patent
Zhang et al.

(10) Patent No.: US 7,399,326 B2
(45) Date of Patent: Jul. 15, 2008

(54) CARBON MONOXIDE CLEAN-UP IN A PEM FUEL CELL SYSTEM

(75) Inventors: Yan Zhang, Victor, NY (US); John Ruhl, Rochester, NY (US); Annette M Brenner, Honeoye Falls, NY (US); Craig S Gittleman, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 700 days.

(21) Appl. No.: 10/793,491

(22) Filed: Mar. 4, 2004

(65) Prior Publication Data

US 2005/0193627 A1    Sep. 8, 2005

(51) Int. Cl.
*B01J 7/00* (2006.01)
*B01D 53/14* (2006.01)

(52) U.S. Cl. .......................... 48/61; 48/127.9; 429/19; 423/651; 423/246; 423/247; 423/652; 422/198; 422/169; 422/129

(58) Field of Classification Search ................ 48/198.3; 423/651; 429/19
See application file for complete search history.

(56) References Cited

U.S. PATENT DOCUMENTS

| | | | |
|---|---|---|---|
| 6,063,161 A | 5/2000 | Keefer et al. | |
| 6,103,143 A | 8/2000 | Sircar et al. | |
| 6,524,550 B1 | 2/2003 | Chintawar et al. | |
| 6,921,597 B2 * | 7/2005 | Keefer et al. | 429/34 |
| 2002/0114984 A1 * | 8/2002 | Edlund et al. | 429/19 |
| 2003/0208960 A1 * | 11/2003 | Narasimhan et al. | 48/198.3 |
| 2004/0223908 A1 * | 11/2004 | Holladay et al. | 423/648.1 |
| 2005/0098034 A1 * | 5/2005 | Gittleman et al. | 95/96 |

OTHER PUBLICATIONS

Haldor Topsoe A/S—PK-7R Low Temperature Methanation Catalyst, brochure from the web page of www.haldortopsoe.com, printed Feb. 20, 2004.

Sun, James and Johnson, Matthey, Fuel Cell Today—Hydrogen Generation for PEM Fuel Cells, Article 319 from www.fuelcelltoday.com, Sep. 2001.

* cited by examiner

*Primary Examiner*—Alexa D. Neckel
*Assistant Examiner*—Kaity V. Handal

(57) ABSTRACT

A fuel processor system is provided including an autothermal reactor (ATR), a pressure swing adsorber (PSA) located downstream of the ATR, and a methanation reactor located downstream of the PSA. A method of operating of proton exchange membrane fuel cell stack involves cooling the methanator output and feeding it into the stack as an anode fuel.

16 Claims, 2 Drawing Sheets

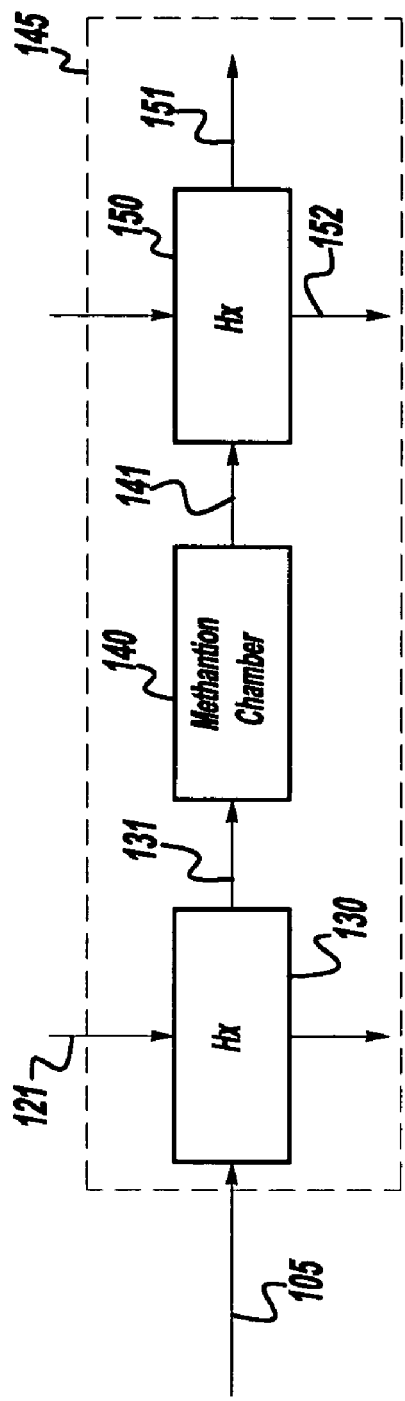
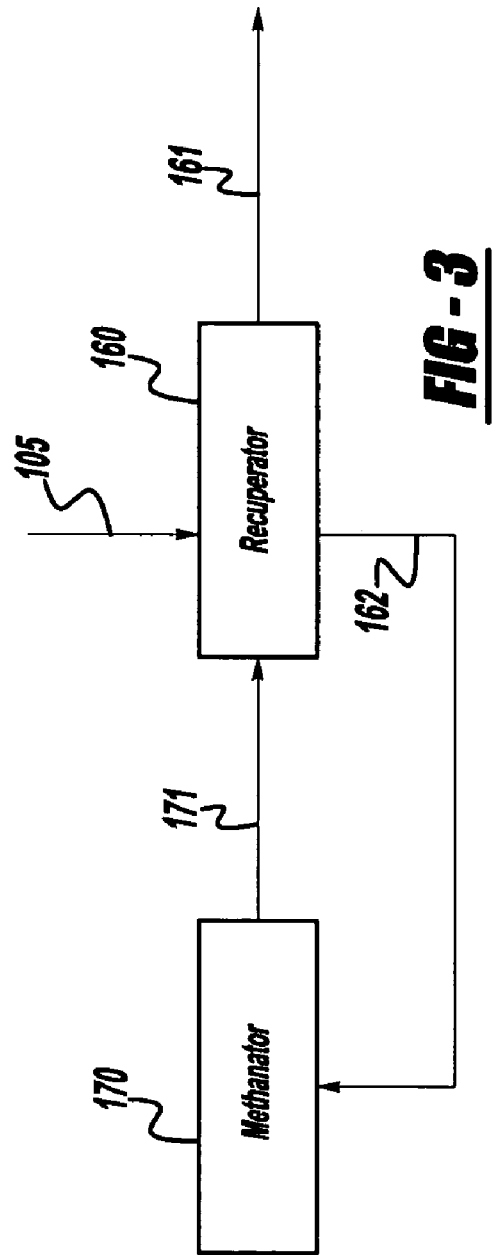

CARBON MONOXIDE CLEAN-UP IN A PEM FUEL CELL SYSTEM

FIELD OF THE INVENTION

The present invention relates generally to a fuel processor for a hydrogen fuel cell engine, and more specifically to such a processor which uses methanation and Pressure Swing Adsorption for CO clean-up.

BACKGROUND OF THE INVENTION

In proton exchange membrane (PEM) fuel cells, hydrogen is the anode reactant and oxygen is the cathode reactant. The anode and cathode are made of finely divided catalytic particles, which are typically of costly precious metal. The membrane electrode assemblies are relatively expensive to manufacture and require certain conditions for effective operation. For example, carbon monoxide poisons the platinum catalyst typically used in the anode and cathode. In order to reduce catalyst loading, the CO level of the anode fuel should be as low as possible, preferably 5 ppm or less.

For vehicular applications, it is desirable to use a liquid fuel such as hydrocarbons (such as gasoline), alcohols (for example methanol or ethanol), and/or mixtures thereof (for example blends of ethanol or methanol and gasoline) as the source of hydrogen for the fuel cell. Such liquid fuels for the vehicle are easy to store onboard and there is a nationwide infrastructure for supplying liquid fuels. Gaseous fuels such as methane, natural gas, or propane may also be used. Dissociation of such fuels to produce hydrogen is accomplished within a chemical fuel processor or reformer. The fuel processor contains one or more reactors wherein the fuel reacts with steam (and sometimes air) to yield a reformate gas containing primarily hydrogen and carbon dioxide. For example, in the steam methanol reformation process, methanol and water are ideally reacted to generate hydrogen and carbon dioxide. In practical application, the reactors inevitably produce small quantities of carbon monoxide, which must be removed before the hydrogen containing stream is fed as anode reactant to a PEM cell. For example, in a gasoline reformation process, steam, air and gasoline are reacted in a primary reactor. In a first reaction, air reacts with the fuel exothermally, while in a second reaction steam reacts with the fuel endothermically. The primary reactor produces hydrogen, carbon dioxide, carbon monoxide, and water.

Reactors downstream of the primary reactor are generally required to lower the CO concentration in the hydrogen-rich reformate to levels tolerable in the fuel cell stack. Downstream reactors may include a water gas shift reactor (WGS), a preferential oxidation reactor (PROX) or series of these reactors. The water gas shift reactor produces additional hydrogen from water and carbon monoxide. The outlet carbon monoxide concentration from the WGS reactor is limited by the thermodynamic equilibrium of the water gas shift reaction. The preferential oxidation reactor selectively oxidizes carbon monoxide in the presence of hydrogen to produce carbon dioxide using oxygen from air as an oxidant. Control of air feed is important to selectively oxidize CO to $CO_2$. The preferential oxidation reactor is not 100% selective, and results in consumption of hydrogen. The heat generated from the preferential oxidation reactor is at a low temperature, resulting in excess low-grade heat that is difficult to integrate into the fuel processor system.

In application Ser. No. 09/780,079 filed Feb. 9, 2001, a pressure swing adsorber (PSA) is described and a method for reducing the CO level of a hydrogen-containing stream is provided. The pressure swing adsorber can purify a reformate stream or the output of a water gas shift reactor to a near pure hydrogen stream with a carbon monoxide level acceptable for use in PEM cell. The pressure swing adsorber does not consume hydrogen, but must be sized appropriately to lower the CO concentration below 5 ppm before input into the fuel cell. It would be desirable to provide a system for reducing CO so that the size of any such adsorber may be minimized.

SUMMARY OF THE INVENTION

To address the shortcomings noted above and to provide other advantages in fuel cell operations, the present invention provides an apparatus and method for removing carbon monoxide from a hydrogen-rich gas stream. In one aspect, a system comprises a first reactor, an adsorbent apparatus downstream from the first reactor, and a methanation reactor downstream from the apparatus. The first reactor (or reactor and heat exchanger series) produces a first hydrogen-rich gas stream containing carbon monoxide. The adsorbent apparatus contains a vessel housing an adsorbent or combination of adsorbents adapted to adsorb carbon monoxide, carbon dioxide and other non-hydrogen components of the first hydrogen-rich gas stream (water and nitrogen). The adsorbent apparatus reduces the amount of carbon monoxide in the first stream to produce a second hydrogen-rich stream.

In another aspect, a fuel processor system contains an autothermal reactor (ATR) that produces a hydrogen-rich first gas stream containing carbon monoxide. Downstream of the ATR is a pressure swing adsorber sized to reduce the CO level in the first stream and produce a second hydrogen-rich gas stream containing more than 5 ppm carbon monoxide. Downstream of the PSA, there is a methanation reactor sized to reduce the CO level of the second stream below 5 ppm.

In a further aspect of the invention, a method for reducing the carbon monoxide concentration in a hydrogen-containing gas stream comprises passing the hydrogen-rich gas stream through an adsorbent apparatus containing a material that adsorbs carbon monoxide and carbon dioxide, and passing the output stream of the adsorbent apparatus through a methanation reactor. The hydrogen-rich stream used as input to the adsorbent apparatus may be produced for example in an autothermal reactor. The autothermal reactor produces a first hydrogen-rich gas stream with a first carbon monoxide level. The output of the adsorbent apparatus is a second hydrogen-containing stream having a concentration of CO lower than that of the first stream. The second stream is input to the methanation reactor to produce a third stream with a carbon monoxide level lower than that of the second stream.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further objects, features and advantages of the present invention will become apparent by reference to the following detailed description and drawings in which:

FIG. 2 is a schematic diagram of one embodiment of a fuel processor of the present invention; and FIG. 3 is a schematic diagram of an alternative embodiment of the invention.

DETAILED DESCRIPTION OF THE PREFERRED EMBODIMENTS

Figure 1:
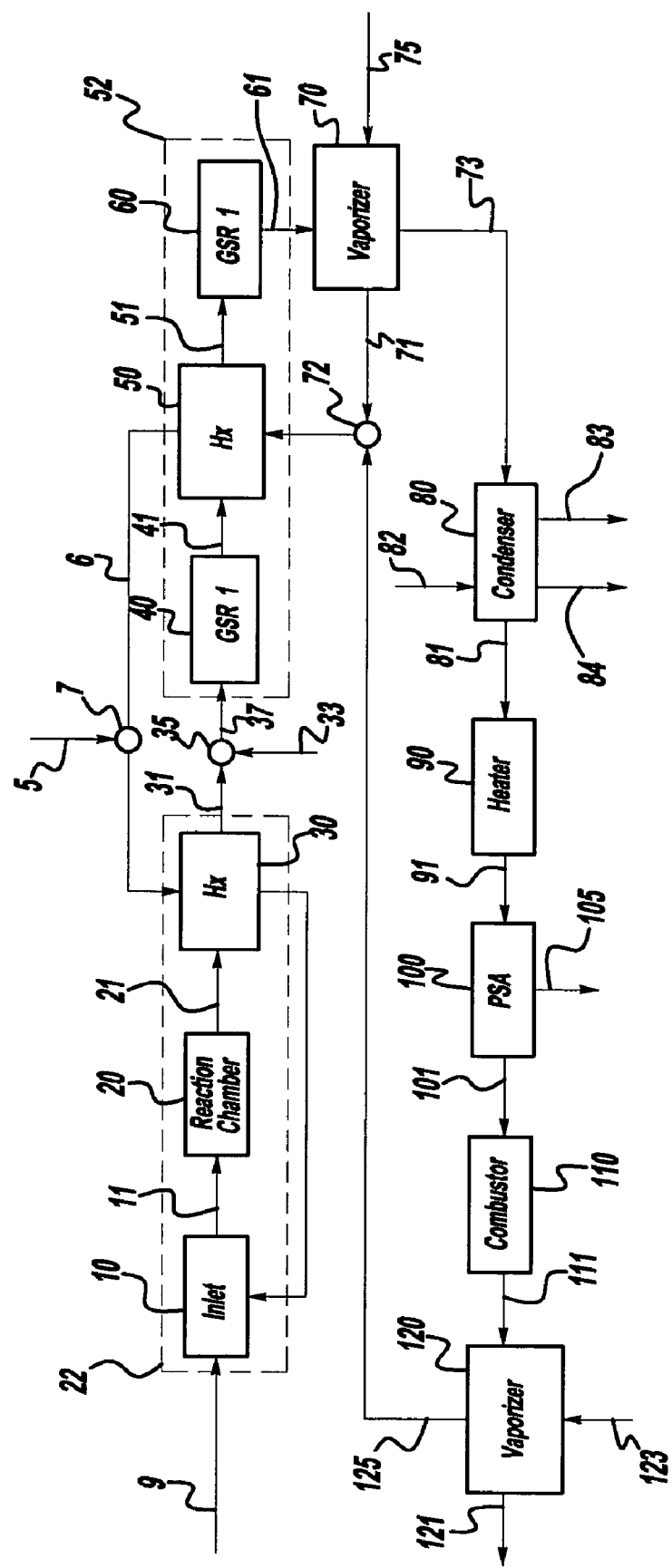
FIG. 1 is a schematic diagram of an ATR based fuel processor.

A fuel processor system contains a first reactor that produces a first hydrogen-rich gas stream. The first hydrogen-rich gas stream contains varying amounts of carbon monoxide, depending on the conditions of reaction and the fuel used in the first reactor. An adsorption apparatus downstream from the first reactor comprises a vessel housing an adsorbent or combination of adsorbents adapted to adsorb carbon monoxide and any other impurities in the hydrogen-rich gas stream such as carbon dioxide, nitrogen, and water. The adsorbent apparatus purifies the first stream to produce a near-pure hydrogen stream with less carbon monoxide. The system further comprises a methanation reactor downstream from the adsorbent apparatus. The downstream adsorbent apparatus and methanation reactor act together to reduce the carbon monoxide concentration of the hydrogen-containing gas stream produced by the first reactor to a level acceptable for use as anode fuel for a PEM fuel cell. In one embodiment of the invention, the system further comprises a water gas shift reactor situated between the first reactor and the adsorbent apparatus.

Conventional pressure swing adsorption (PSA) systems are very large and consist of a minimum of two separate adsorption vessels requiring numerous valves and manifolds. In a two-vessel system, one vessel would be in the adsorption mode and the second vessel would be in various stages of depressurization or blowdown, purge, and pressurization. Many commercial hydrogen PSA cycles use four beds, with one bed in the production stage at any given time, and the other three beds in various stages of equalization, blowdown, purge, and pressurization. See, for example U.S. Pat. No. 3,453,418 issued to Wagner; and U.S. Pat. No. 3,564,816 issued to Batta, each of the disclosures of which is incorporated herein by reference in its entirety. Also, some commercial hydrogen PSA cycles use twelve beds, with four beds in the production stage at any given time, and the other eight beds in various stages of equalization, blowdown, purge, and pressurization. See for example U.S. Pat. No. 3,846,849 issued to Fuderer et al., the disclosure of which is incorporated herein by reference in its entirety. These PSA cycle stages are described in detail below. It is well known that PSA systems with more than two vessels exhibit higher hydrogen recoveries and reduced power consumption by incorporating pressure equalization steps. These multiple, staged fixed bed PSA systems, however, contain complex valve arrangements and are non-continuous due to the cycling of these valves.

In a preferred embodiment, the adsorbent apparatus is a pressure swing adsorber, described further below. The pressure swing adsorber comprises multiple fixed beds containing adsorbent and valves that direct the flow of gas through the adsorbent beds in accordance with a pressure swing adsorption cycle. Said cycle will include PSA steps as described below. Preferably, the valves are two rotary valves to enable the most compact apparatus. A preferred pressure swing adsorber is described in applications Ser. No. 09/780,079, published on Aug. 15, 2002, as U.S. application Ser. No. 2002/011,503 and U.S. Ser. No. 09/780,184, published on Aug. 15, 2002, as U.S. application Ser. No. 2002/110,504, the disclosures of which are useful as background and are incorporated by reference.

Alternatively, rotating adsorber vessels allow for continuous production in a relatively small system with minimum valving. Rotating pressure swing adsorption systems are described by Petit et al in U.S. Pat. No. 5,441,559; and by Keefer et al. in PCT Publication No. WO 99/28013, each of the disclosures of which is incorporated herein by reference in its entirety. Rotation of the vessel allows the adsorbent mixture to cycle between various regions for adsorption, depressurization, purge, and pressurization (as described below) with cycle times much smaller than those of conventional PSA systems. The cycle in which the adsorber is used will now be described.

The cycle stages for the adsorber are as follows.

Adsorption

During the adsorption step, a stream containing carbon monoxide, such as the reformate effluent from a water gas shift reactor, is fed over the adsorbent(s) at the higher feed pressure. Carbon monoxide and carbon dioxide adsorb on the adsorbent, and the product gas contains nearly pure hydrogen. The remainder of the adsorber product is primarily nitrogen. The adsorber product gas will contain a reduced level of carbon monoxide, for example below 400 ppm and preferably less than about 100 ppm. The production step is stopped before carbon monoxide breaks through the outlet of the adsorber vessel. At the end of the production step, the adsorbent is nearly saturated with the adsorbed gases and the vessel is at elevated pressure with hydrogen, carbon monoxide, carbon dioxide, water, and nitrogen.

Depressurization

The adsorber vessel is depressurized from the feed pressure to the purge pressure by exhausting the gas in the direction counter-current to the adsorption direction. During depressurization, the outlet of the adsorber vessel is sealed. Alternatively, the vessel can be depressurized co-currently, and the vessel inlet is sealed. The depressurization exhaust gas contains hydrogen, carbon monoxide, carbon dioxide, water, and nitrogen. The exhaust will exit the adsorber vessel at atmospheric pressure and can be sent to the combustor or recycled into another part of the adsorber or the fuel processor system.

Purge

The adsorber vessel is purged with the expanded exhaust from the PEM fuel cell stack, low pressure superheated steam, or other suitable purge gas (such as a fraction of the CO-free reformate). The purge stream flows at ambient pressure in the direction counter-current to the adsorption direction. The adsorber may also be purged by pulling a vacuum from the direction counter-current to the adsorption direction using a vacuum pump. The exhausted purge gas will contain most of the adsorbed carbon monoxide and other adsorbed gases. The purge step is terminated when essentially all of the carbon monoxide and other adsorbed gases have been desorbed from the adsorbent(s).

Pressurization

The adsorber vessel is pressurized back up to the adsorption pressure in the same direction as the adsorption step using, for example, a cooled hydrogen-rich product from a water gas shift reactor. During pressurization, the outlet of the vessel is sealed. Alternatively, the vessel may be pressurized using a fraction of the hydrogen-rich product from the adsorber in a direction counter-current to the production direction, and the vessel inlet is sealed. After pressurization, the adsorber returns to the adsorption step and the cycle continues indefinitely.

Equalization stages, which are well known to those skilled in the art of PSA systems, may be added to the adsorption cycle to enhance hydrogen recovery and reduce the compressor power consumption. For example, one vessel or section of the rotating vessel that has just completed the adsorption step may be equalized, or connected via the outlets of both sections, with another section that has just completed the purge step. During this equalization, the pressure in the first section is reduced and the pressure in the second section is increased accordingly. Also, the hydrogen remaining in the first section of the vessel at the end of adsorption is partially recovered in the second section, which has completed the purge step.

The adsorbent apparatus contains an adsorbent adapted to adsorb carbon monoxide, carbon dioxide and any other impurities in the hydrogen-rich gas stream such as nitrogen and water. Suitable adsorbers include, without limitation, 5A zeolite, 13X zeolite, and LiX zeolite. These adsorbents selectively adsorb carbon dioxide over carbon monoxide; in use they will tend to adsorb carbon dioxide in the feed gas before adsorbing carbon monoxide. Other suitable adsorbents adsorb carbon monoxide preferentially, but can also adsorb carbon dioxide. Non-limiting examples include oxides or salts of copper impregnated or exchanged on activated carbon, alumina and zeolites; oxides or salts of silver impregnated or exchanged on activated carbon, alumina, and zeolite; and oxides or salts of tin impregnated or exchanged on activated carbon, alumina, or zeolite. Mixtures of adsorbents may be used as well.

In other preferred embodiments, the fuel processor system further comprises a heat exchanger disposed between the adsorbent apparatus and the methanation reactor. The heat exchanger raises the temperature of the second hydrogen-rich stream before it enters into the methanation reactor. In some embodiments, the system further comprises a recuperator disposed in such a way that the output stream of the adsorbent apparatus is heated in the recuperator by the output stream of the methanator before being input into the methanation reactor.

The methanation reactor contains a catalyst that catalyzes CO methanation and also typically $CO_2$ methanation. In CO methanation, carbon monoxide and hydrogen react to form methane and water, while in $CO_2$ methanation, $CO_2$ and hydrogen react to form methane and water. It can be seen that hydrogen loss in the methanation reaction is related to the amount of carbon monoxide being removed, but there is also the possibility of losing hydrogen through methanating $CO_2$. Three hydrogen molecules are required to convert carbon monoxide to methane and four hydrogen molecules for carbon dioxide. To minimize hydrogen loss from reaction with carbon dioxide, it is preferred to use an adsorbent apparatus, preferably a pressure swing adsorber to remove carbon dioxide upstream. Further, because hydrogen is consumed in the reaction, it is preferred to use the methanation reactor in systems of the invention in situations where the input stream has a relatively low concentration of carbon monoxide and carbon dioxide. The adsorbent apparatus, preferably a pressure swing adsorber, may be sized optimally for the tradeoffs between acceptable low level of carbon monoxide for input into the methanation reactor (hydrogen consumption), size of the adsorption apparatus and methanation reactor, and cost.

Conventional methanation catalysts may be used. Some suitable catalysts are described for example in the "Methanation" chapter of the Wiley-Interscience *Encyclopedia of Catalysis*, the disclosure of which is useful as background and is hereby incorporated by reference. Among suitable catalysts are Fischer-Tropsch catalysts containing cobalt or iron. Other examples include precipitated catalysts and nickel catalysts such as Raney nickel. Other potential catalysts, including, without limitation Rh, Ru, Pt, or alloy catalysts, Co, Mo, or other promoted catalysts, on various supports including, but not limited to $Al_2O_3$, $SiO_2$, $CeO_2$, and $TiO_2$ have been reported in the literature. The catalyst is often coated on a monolithic type substrate, for example but not limited to cordierite or metallic monoliths or foams. A typical operating temperature range for such catalysts is 190-450° C. Catalysts having a wide range of properties and activities may be selected according to particular requirements. In some embodiments, the catalyst may be chosen to optimize activity at low operating temperature, to minimize reactor size, and/or to reduce costs.

The stage where hydrogen is first extracted from the hydrogen-carbon fuel is referred to as reforming. Subsequent conditioning of the hydrogen-rich stream for use in a fuel cell is referred to as CO clean-up. Because air and water are readily accessible materials for practical applications, extraction of hydrogen from hydrocarbons may be achieved by reacting the hydrocarbon fuel with oxygen or water with suitable catalysts. In a partial oxidation reaction, hydrocarbon is reacted with oxygen to form hydrogen and carbon monoxide as major components. The reaction is exothermic, releasing energy as it proceeds. Steam reforming, on the other hand is an endothermic reaction, absorbing energy as it proceeds. In steam reforming, hydrocarbon is reacted with water to form hydrogen, carbon monoxide and carbon dioxide. Although the exothermic and endothermic reactions may be carried out in separate stages, it is possible to combine the reactions in a single catalytic process called autothermal reforming (ATR). In a preferred embodiment, the first reactor of the fuel processor system is an ATR reactor. In this embodiment, the first reactor is known as an autothermal reformer. The thermodynamics of the partial oxidation and steam reforming reactions are such that at high temperatures where efficiency is highest (i.e., producing minimum $CH_4$), a relatively greater amount of carbon monoxide is produced.

Optionally, the system of the invention includes one or more water gas shift reactors, preferably placed downstream of the first reactor and upstream of the adsorbent apparatus. The partial oxidation, steam reforming, or autothermal reforming reaction carried out in the first reactor produces a first hydrogen stream containing some level of carbon monoxide, depending on the equilibrium conditions. The carbon monoxide in this stream can react with water according to the water gas shift reaction, $CO+H_2O \leftrightarrow CO_2+H_2$, therefore reducing the amount of CO fed to the adsorbent apparatus. The water can be present from the prior reactor or added just upstream of the WGS reactor(s). The extent of the reaction, and the relative removal of CO, is limited by the thermodynamic equilibrium, which is determined by the temperature of the WGS reaction. CO is preferably converted to $CO_2$ at low temperature. At the elevated temperatures of the autothermal reactor, the yield of hydrogen is limited by the equilibrium.

The WGS reactor is either a high temperature WGS reactor (320° C.-500° C.), a medium temperature WGS reactor (250° C.-400° C.), or a low temperature WGS reactor (150° C.-250° C.). Alternately, the reactor can include a combination of high, medium and low temperature WGS reactors that employ a technique for cooling the reformate gas as it flows between the different temperature reaction zones. Generally, the temperature of the WGS reactor decreases with the direction of the reformate gas flow.

According to the invention, it is possible to employ a single high temperature WGS reactor or a single medium temperature WGS reactor. These types of reactors are generally smaller than a low temperature WGS reactor or a system with one or more WGS reactors, even though the high temperature WGS reactor does not reduce the CO to very low levels because of equilibrium constraints. This is possible because of the ability of the PSA device to handle relatively high CO levels that cannot be tolerated by conventional systems that use PROX reactors to convert CO to $CO_2$. Conventional catalysts, such as $Fe_3O_4/Cr_2O_3$ for high temperature shifts or $CuO/ZnO/Al_2O_3$ for low temperature shifts, may be used, as well as any other known WGS catalyst.

In a potential embodiment, the water gas shift catalyst is one described in Chintawar, et al., U.S. Pat. No. 6,524,550, the disclosure of which is incorporated by reference. The catalyst is based on a platinum group metal selected from the group consisting but not limited to, platinum, palladium, iridium, osmium, rhodium, and mixtures thereof and mixtures of various promoters. The platinum group metal may be supported on an oxide of titanium, zirconium, or cerium. The catalyst can be coated on a monolith substrate.

The WGS reactor generates a hydrogen-rich stream that is primarily hydrogen, nitrogen, carbon monoxide, carbon dioxide and water. The reformate gas will typically include about 0.3-3 mole percent CO depending on the exit temperature of the WGS reactor, the space velocity of the reformate gas in WGS reactor, the steam to carbon ratio, and the catalyst used.

The adsorbent apparatus preferably operates on a principle of pressure swing adsorption. As noted above, the adsorbent apparatus may be sized to produce an output stream (referred to as a "second hydrogen-rich stream") with a CO level suitable for clean up in the downstream components of the system. In some embodiments, that level is less than 400 ppm carbon monoxide. The level of carbon monoxide will be determined by the trade off between the size of adsorbent apparatus, the size of the downstream methanation system, the system efficiency and cost From the adsorbent apparatus, the second hydrogen-rich stream enters the methanation reactor, wherein the CO concentration is reduced to a level below that which would poison the catalyst in a fuel cell stack. In a preferred embodiment, the fuel system of the invention further comprises a fuel cell stack disposed in such a way as to receive the output of the methanation reaction as an input fuel. Preferably the input fuel to the fuel stack contains carbon monoxide at a level of 5 ppm or less; more preferably the concentration of CO is 1 ppm or less.

Referring to FIG. 1, hydrocarbon fuel, for example gasoline, methanol, ethanol, mixtures of gasoline and alcohol, natural gas, methane, or propane and the like, is fed into a first reactor 22 through a stream 9. The stream 9 enters an inlet 10 of the reactor 22, where as shown it is warmed to the desired temperature by heat exchange from a compressed air stream 5 and steam stream 6 that flow through a heat exchanger 30 to warm up. The stream 11 passes through a reaction chamber 20—which may be an autothermal reactor—to produce an output stream 21 that next flows through a heat exchanger 30 to produce a first hydrogen-rich stream 31. As shown, the first hydrogen-rich stream 31 is combined with a stream of water 33 by water injector 35 to produce an input stream 37 into an optional series of water gas shift reactors 52. As shown, the stream 37 first enters a first water gas shift reactor 40 to produce an output stream 41.

The reaction chamber 20 contains a steam-reforming and/or partial oxidation catalyst suitable for the specific fuel used. The temperature of the first reactor 22 depends on the nature of the fuel and the relative compositions of fuel, air and water. Typically the temperature of reaction is between about 300° C. and about 1200° C. In the first reactor 22, the fuel is converted to a first hydrogen-rich stream 31 by partial oxidation, stream reforming, or autothermal reforming.

In general, the water gas shift reactors may be a high temperature water gas shift reactor (320° C.-500° C.), a medium temperature reactor (250-400° C.), or a low temperature reactor (150° C.-250° C.). Alternatively, as shown in FIG. 1, the water gas shift reactor may consist of a series of reactors. As shown, the second water gas shift reactor 60 operates at a lower temperature than the first water gas shift reactor 40 to promote CO conversion. To cool the output stream 41 of the first gas shift reactor 40, advantage is taken of the cooling capacity of stream 72 derived from vaporizer 70 and vaporizer 120. The steam stream 72 is fed to the heat exchanger 50 to lower the temperature of the stream 51 for input into the second gas shift reactor 60. The output stream 61 is preferably fed into a vaporizer where water input stream 75 provides cooling. Water vapor stream 71 from the vaporizer provides cooling to the water gas shift reactor as discussed above. The output stream 73 of the vaporizer is fed into a condenser 80, where excess water can be condensed before input to the adsorbent apparatus. As shown, the condenser 80 is cooled with air at input stream 82 and output stream 83. Water may be removed at stream 84. The output stream 81 of the condenser, containing a level of carbon monoxide it is desired to reduce, is passed through an optional heater 90 to prepare an input stream 91 of an adsorbent apparatus 100. The adsorbent apparatus produces a stream 105 containing primarily hydrogen, but also some nitrogen, and low levels of carbon monoxide. The stream 105 may be fed to a fuel stack if the CO level is low enough. Although the output stream 105 of the adsorbent apparatus 100 contains some carbon monoxide, the majority of the carbon monoxide and all of the carbon dioxide of the second hydrogen-rich stream 61 exits the adsorbent apparatus in the stream 101 that is fed to a combustor 110. The output of the combustor forms an output stream 111 that is fed into a vaporizer. As shown, the hot stream 111 from the combustor 110 passes through the vaporizer and exits as an exhaust stream 121. At the same time, heat from the stream 111 is used to vaporize an input water stream 123. That heat is reused in the system as shown to provide a heat exchange stream 125, which is combined with water vapor stream 71, and further heated by heat exchangers 50 and 30 to the desired inlet temperature of reactor 22.

FIG. 2 shows an embodiment of the invention wherein a methanation reactor 145—shown as encompassing an upstream heat exchanger 130 and a downstream heat exchanger 150 in addition to the methanation reaction chamber 140 containing the methanation catalyst—is placed downstream of the adsorbent apparatus shown in FIG. 1. The second hydrogen-containing gas stream 105 that is output of the adsorbent apparatus of FIG. 1 is fed into a heat exchanger 130 for the methanator reactor 145. Conveniently, the exhaust stream 121 containing waste heat may also feed into the heat exchanger 130. The output stream 131 of the heat exchanger is fed into the methanation reaction chamber 140. The output stream 141 of the methanation reaction chamber 140, preferably containing carbon monoxide at levels below 5 ppm and more preferably below 1 ppm, is next passed through a second methanator heat exchanger 150 in order to reduce the temperature of the third hydrogen-containing stream 151 to a temperature suitable for use as an anode fuel of a fuel cell. Such a temperature may be about 80° C., whereas the methanation may be efficiently carried out at about 300° C.

While the methanation reactor typically operates at about 300° C., the typical temperature of the output stream 105 of the adsorbent apparatus is about 65° C. As shown in FIG. 2, the adsorbent apparatus output stream can be preheated in heat exchanger 130 by the combustor exhaust stream 121 to 300° C. before entering the methanation reaction chamber 140. The methanation product stream 141 can be cooled by air stream 83 from the condenser 80 to a desirable fuel cell stack inlet temperature, e.g. about 80° C. The cooled methanation product stream 151 can either be fed directly to a fuel cell engine (not shown) or stored for future delivery to a fuel cell engine.

If there is enough heat released from the methanation reaction, for example, in the case of a relatively high CO concentration in the input stream 105, a simpler heat exchanging scheme can be utilized, as shown in FIG. 3.

FIG. 3 shows an alternative embodiment of the invention, where the stream 105 is fed into a recuperator 160. The output stream 162 of the recuperator is then fed into a methanation reactor 170. The output of the methanation reactor 171 then flows through the recuperator 160, which serves as a heat exchanger to bring the temperature of the output stream 161 to a suitable temperature for use in the hydrogen fuel cell. The methanation product stream 161 can either be fed directly to a fuel cell engine (not shown) or stored for future delivery to a fuel cell engine.

Because systems of the invention contain a methanation reaction downstream of the adsorbent apparatus, it has been found that the adsorbent apparatus can be made smaller, while the system still achieves the same low level of carbon monoxide in the third gas stream. With the system shown in FIG. 2, carbon monoxide levels below 5 ppm may be readily achieved.

System modeling may be performed on the system shown in FIG. 1 and FIG. 2 to integrate mass and heat, and to quantify the size reduction of the adsorbent apparatus that comes as a consequence of incorporating the methanation reactor and the associated heat exchanger. In the FIG. 1 simulation (not including a methanator), the PSA outlet stream is 95% hydrogen, 5% nitrogen, and 5 ppm CO. In the FIG. 2 simulation (with a methanator), the PSA outlet stream is 95% hydrogen, 5% nitrogen, and 400 ppm CO. Results of the modeling are shown in Table 1. In the embodiment modeled, a volume savings of 42.3% is achieved, with a penalty of a loss of only 0.1% in fuel processor efficiency. Here efficiency is given as the low heating value of hydrogen divided by the low heating value of fuel, times 100. The very small loss in efficiency is due in part to the consumption of a small amount of hydrogen by the methanator as it removes the final traces of CO from the stream and there is no carbon dioxide in the input stream of methanation reactor. By placing the methanator downstream of the adsorbent apparatus, overall efficiency can be maintained while still allowing for an overall downsizing of the adsorbent apparatus, reaction chambers, and heat exchangers.

reactor. The carbon monoxide concentration in the input stream of methanation reactor was 400 ppm in the table.

The system may be optimized to determine a desirable inlet carbon monoxide concentration to the methanation reactor. In general, a higher inlet CO concentration to the methanation reactor would result in a smaller PSA, but a higher fuel processor efficiency penalty would result due to the higher consumption of hydrogen during CO methanation. However, where the CO concentration is higher, a simpler recuperating heat exchange scheme as shown in FIG. 3 may be used. On the other hand, where the inlet CO concentration to the methanation reactor is lower, there is a smaller fuel processor efficiency penalty, but a larger PSA would be required and a more complicated heat exchanging scheme would be required as shown in FIG. 2. Another trade-off in determining the optimal PSA size is the desired $H_2$ concentration in the methanator product stream fed to the fuel cell system. As the PSA is made smaller, the content of other impurities in the second hydrogen-rich gas stream, such as nitrogen, will increase. Said nitrogen content will not be reduced in the methanation reactor, and thus would be passed through to the fuel cell or storage vessel.

We claim:

1. A system comprising:
    a first reactor that produces a first hydrogen-rich gas stream containing carbon monoxide;
    an adsorbent apparatus comprising multiple staged fixed beds where the adsorbent apparatus is located downstream from the first reactor comprising a vessel housing an adsorbent adapted to adsorb carbon monoxide and further wherein the adsorbent apparatus comprises rotating valves to direct the flow of gases into and out of the multiple staged fixed beds,
    wherein the apparatus reduces the amount of carbon monoxide in the first gas stream to produce a second hydrogen-rich gas stream containing carbon monoxide;
    a methanation reactor downstream from the adsorbent apparatus; and
    a heat exchanger disposed between the adsorbent apparatus and the methanation reactor that raises the temperature of the second hydrogen rich stream before entry into the methanation reactor,
    wherein the downstream components are sized to reduce the concentration of carbon monoxide to a level suitable for use in a PEM fuel cell stack.

TABLE 1

Size reduction of PSA by incorporating methanation reactor

| | CO concentration of PSA output | PSA volume (L) | Total heat exchanger volume (L) | Methanator volume (L) | Total volume of PSA + Methanator + heat exchangers (L) | FP eff* | Volume savings (%) |
|---|---|---|---|---|---|---|---|
| FIG. 1 | 5 | 21.8 | 0.0 | 0.0 | 21.8 | 60.2 | |
| FIG. 2 | 400 | 10.2 | 0.7 | 1.7 | 12.6 | 60.1 | 42.3 |

*fuel processor efficiency defined as the LHV of H2/LHV of Fuel × 100

As shown in Table 1, integrating the methanation reactor with the adsorbent apparatus (shown as a pressure swing adsorber or PSA in the table) can achieve a 42% savings in total volume of the PSA+auxiliary equipment. The fuel processor efficiency penalty (a reduction by 0.1) is small due to the low inlet carbon monoxide concentration and the absence of carbon dioxide in the input stream to the methanation 2. A system according to claim 1, wherein the adsorbent apparatus comprises a pressure swing adsorber.

3. A system according to claim 1, wherein the adsorbent removes carbon dioxide from the first gas stream.

4. A system according to claim 1, further comprising one or more water gas shift reactors disposed between the first reactor and the adsorbent apparatus.

5. A system according to claim 1, wherein the methanation reactor comprises an active metal-containing catalyst.

6. A system according to claim 5, wherein the methanation reactor catalyst is supported on an oxide.

7. A system according to claim 5, wherein the methanation reactor catalyst is coated on a substrate.

8. A system according to claim 1, further comprising a recuperator disposed in such a way that the output stream of the pressure swing adsorber is heated in the recuperator by the methanator output stream before input into the methanator.

9. A fuel processor system to produce hydrogen from a liquid or gaseous fuel for use in a PEM fuel cell, comprising:
   an autothermal reactor that produces a hydrogen-rich first gas stream containing carbon monoxide;
   a pressure swing adsorber downstream of the autothermal reactor sized to reduce the carbon monoxide level in the first stream and produce a second hydrogen-rich gas stream containing greater than 5 ppm carbon monoxide wherein the pressure swing adsorber further comprises rotating valves to direct the flow of gases into and out of multiple staged fixed beds therein;
   a methanation reactor downstream of the pressure swing adsorber that is sized to reduce the carbon monoxide level of the second stream below 5 ppm; and
   a heat exchanger disposed between the pressure swing adsorber and the methanation reactor that raises the temperature of the second hydrogen rich stream before entry into the methanation reactor.

10. A system according to claim 9, wherein the pressure swing adsorber is sized to produce a stream containing less than 400 ppm carbon monoxide.

11. A system according to claim 9, wherein the pressure swing adsorber is sized to produce a stream containing less than 100 ppm carbon monoxide.

12. A system according to claim 9, wherein the pressure swing adsorber contains an adsorbent that removes carbon dioxide.

13. A system according to claim 9, further comprising a recuperator in which the output stream of the pressure swing adsorber is heated by the output stream of the methanation reactor before being input into the methanation reactor.

14. A system according to claim 9, further comprising a fuel cell stack disposed to receive the methanator output stream as anode fuel.

15. A system comprising:
   a first reactor that produces a first hydrogen-rich gas stream containing carbon monoxide;
   an adsorbent apparatus downstream from the first reactor comprising a vessel housing an adsorbent adapted to adsorb carbon monoxide, wherein the apparatus reduces the amount of carbon monoxide in the first gas stream to produce a second hydrogen-rich gas stream containing carbon monoxide;
   a methanation reactor downstream from the adsorbent apparatus, wherein the downstream components are sized to reduce the concentration of carbon monoxide to a level suitable for use in a PEM fuel cell stack; and
   a heat exchanger disposed between the adsorbent apparatus and the methanation reactor that raises the temperature of the second hydrogen rich stream before entry into the methanation reactor.

16. A fuel processor system to produce hydrogen from a liquid or gaseous fuel for use in a PEM fuel cell, comprising:
   an autothermal reactor that produces a hydrogen-rich first gas stream containing carbon monoxide;
   a pressure swing adsorber downstream of the autothermal reactor sized to reduce the carbon monoxide level in the first stream and produce a second hydrogen-rich gas stream containing greater than 5 ppm carbon monoxide;
   a methanation reactor downstream of the pressure swing adsorber that is sized to reduce the carbon monoxide level of the second stream below 5 ppm; and
   a heat exchanger that raises the temperature of the second stream before input into the methanation reactor.

* * * * *